United States Patent

[11] 3,600,047

[72] Inventor Robert W. MacDonnell
 Crete, Ill.
[21] Appl. No. 18,604
[22] Filed Mar. 11, 1970
[45] Patented Aug. 17, 1971
[73] Assignee Unity Railway Supply Co., Inc.
 Continuation-in-part of application Ser. No. 760,019, Sept. 16, 1968, and a continuation-in-part of 676,259, Oct. 18, 1967, now Patent No. 3,401,991, dated Sept. 17, 1968.

[54] PRECOMPRESSED SIDE BEARING
 17 Claims, 10 Drawing Figs.
[52] U.S. Cl. .................................................. 308/138
[51] Int. Cl. ................................................. F16c 25/04
[50] Field of Search .......................................... 308/138, 137, 224

[56] References Cited
 UNITED STATES PATENTS
 3,514,169 5/1970 MacDonnell ................. 308/138

Primary Examiner—Martin P. Schwadron
Assistant Examiner—Frank Susko
Attorneys—E. Manning Giles, J. Patrick Cagney and Peter S. Lucyshyn ABSTRACT: Side bearing units are provided with a precompression arrangement that limits upward expansion so that contact of the side bearing with the car body is precluded during level ride conditions and during high roll conditions. A rugged retainer pin projects through a floating upper wedge and through the main housing to limit upward travel of the wedge. Compression springs acting on sliding wedge blocks that engage the floating wedge are held compressed by the retainer pin.

The wedge blocks have serrations to define accurately wear teeth on their top faces to indicate the amount of wear and the size of shim required to compensate for wear.

A high energy compression spring nest requiring minimum travel is utilized to achieve a compact unit.

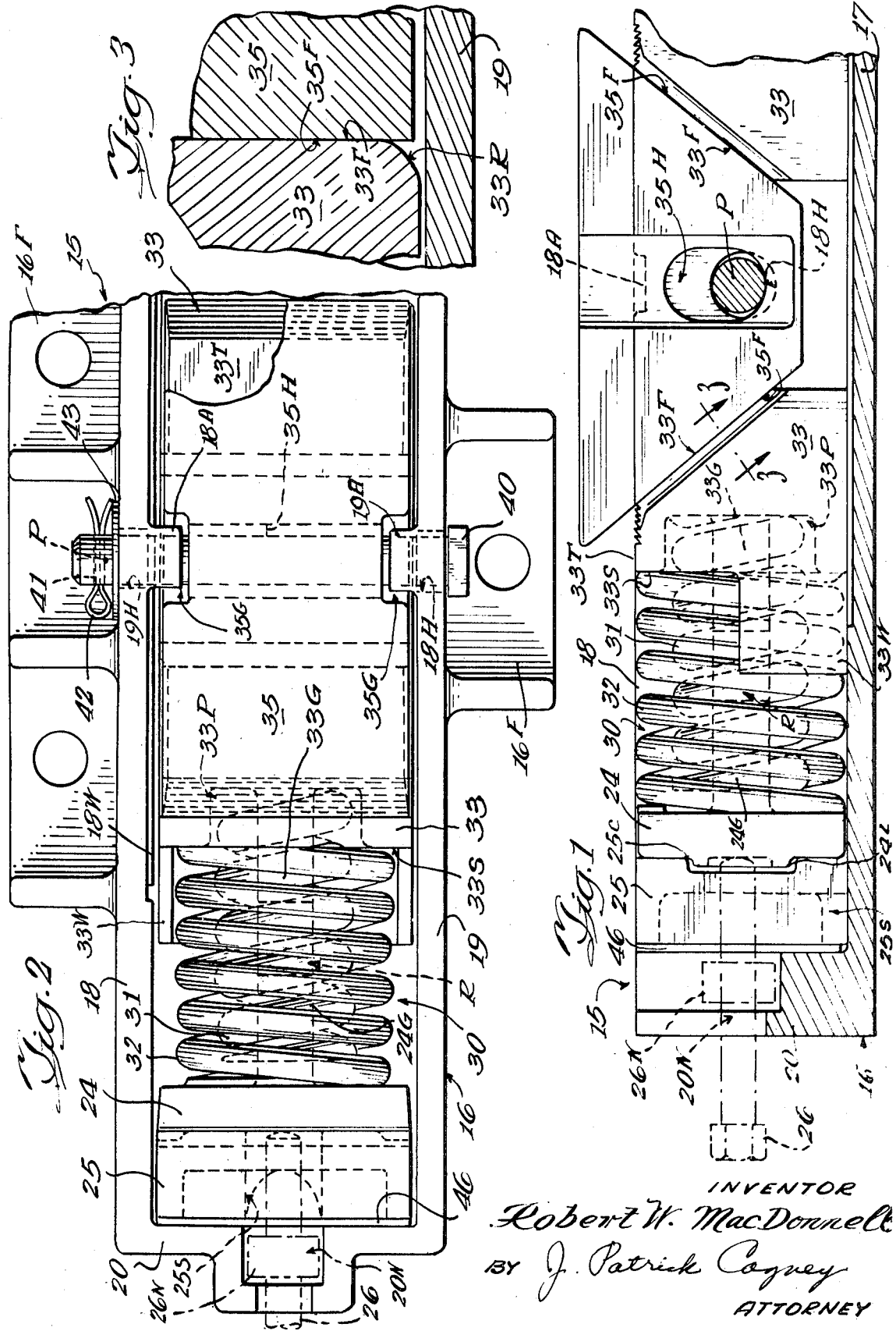

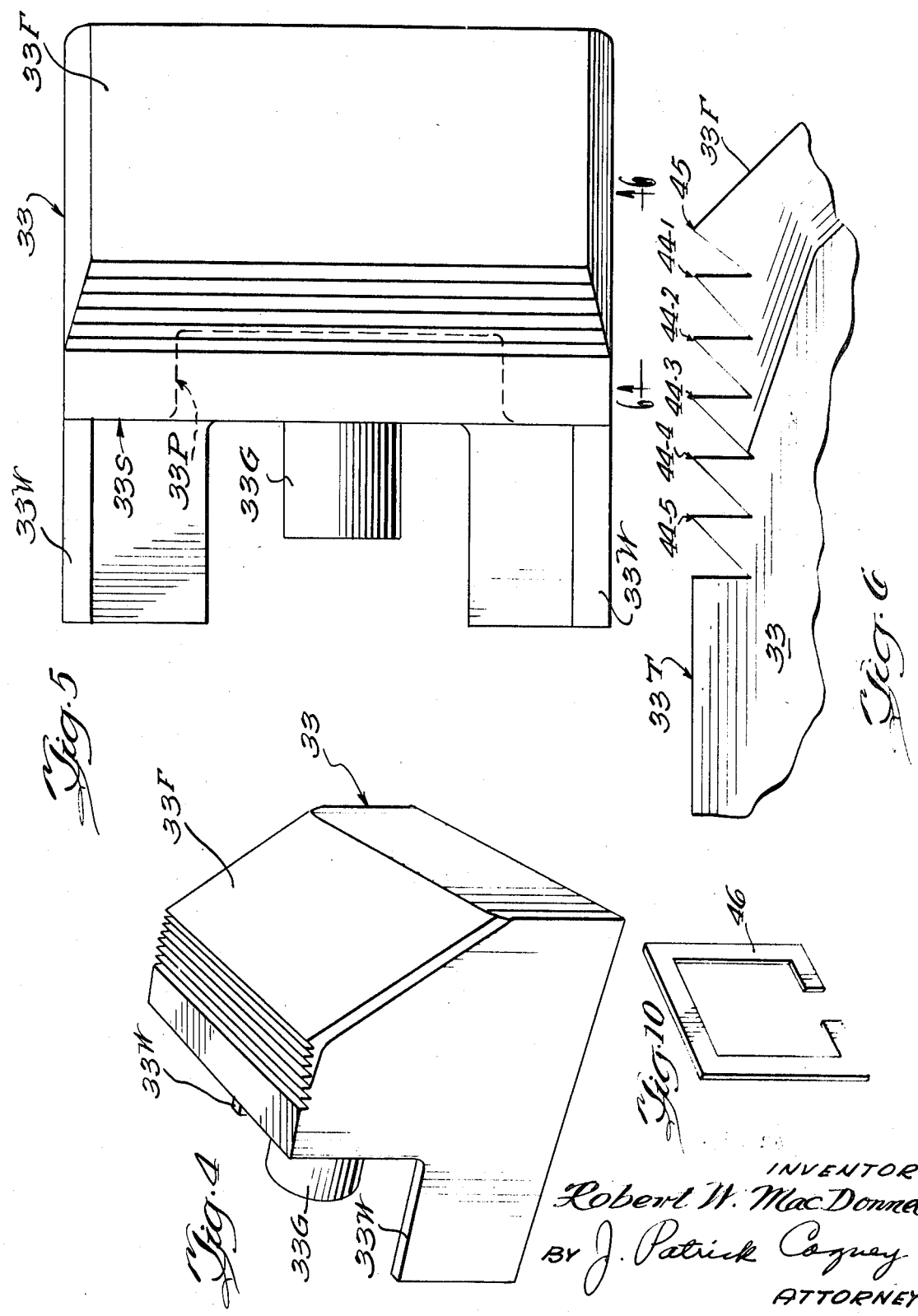

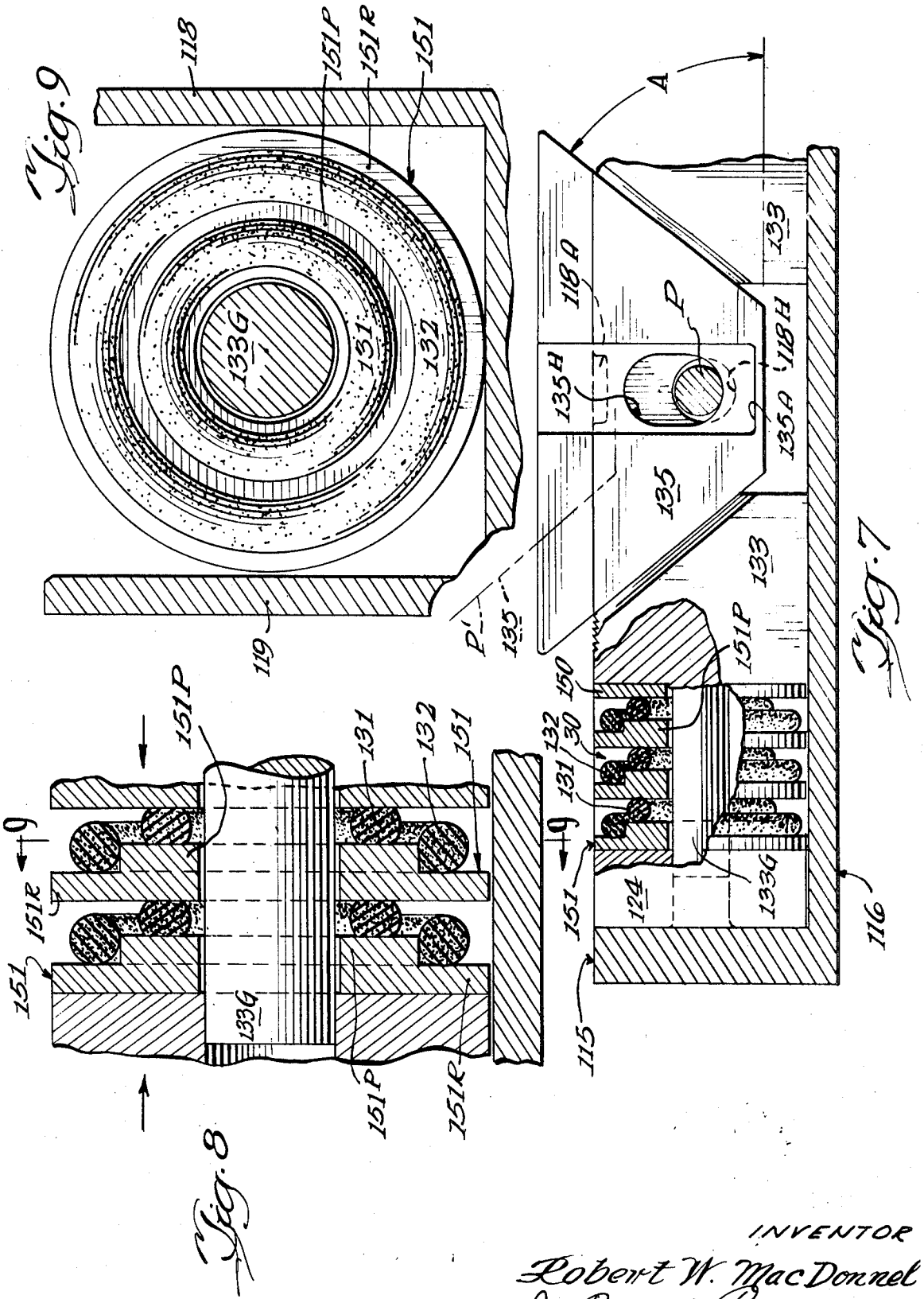

3,600,047

PRECOMPRESSED SIDE BEARING

RELATED APPLICATIONS

This application is filed as a continuation-in-part of pending MacDonnell application Ser. No. 760,019 which was filed Sept. 16, 1968 and a continuation-in-part of a then pending MacDonnell application Ser. No. 676,259 filed Oct. 18, 1967 which was issued Sept. 17, 1968 as U.S. Pat. No. 3,401,991.

BACKGROUND OF THE INVENTION

This invention relates to side bearing units interposed between a railway truck bolster and a car body to control body roll.

In some applications, there is a need for a side bearing unit that acts only during high roll conditions thereby affording a smoother ride during level or low roll conditions. A precompression arrangement for these circumstances must withstand a high energy return or release stroke following full stroke compression of the side bearing unit.

There is also a need for compact side bearing units capable of developing high energy dissipation over a short travel stroke, this being particularly desirable where a precompression arrangement is incorporated in the side bearing unit. The compression spring assemblies of the metal coil type require relatively long travel and relatively large mounting clearances.

The energy dissipation characteristics of the side bearing units change with wear in that the compression springs act over a different travel range as the spring pocket clearances increase due to wear of the slideable wedge blocks. There is a need for an improved arrangement for indicating wedge block wear.

SUMMARY OF THE INVENTION

The present invention provides a precompression arrangement for side bearing units to establish and maintain a predetermined preload, the precompression arrangement serving to preclude contact of the side bearing with the car body during level ride conditions.

In accordance with the present invention, a precompression arrangement is provided for a side bearing assembly of the type that includes a boxlike support having a bottom wall, a pair of upstanding sidewalls and a pair of upstanding end walls, a pair of wedge blocks slidably mounted on bottom wall, the wedge blocks having oppositely inclined downwardly converging surfaces, an upper plunger wedge mounted on the wedge blocks and having oppositely inclined downwardly converging underface portions slidably engaged on and mating with the inclined block surfaces, and compression spring means reacting oppositely outwardly on the end walls and resiliently biasing the wedge blocks oppositely inwardly, the precompression arrangement acting to stop upward travel of the plunger wedge at a top preload position whereat the plunger wedge holds the wedge blocks in spaced-apart relation to maintain predetermined compression of the spring means, the precompression arrangement including a retainer pin projecting through the sidewalls and the plunger wedge, the sidewalls having aligned holes substantially centrally thereof and the plunger wedge having a transverse hole substantially centrally thereof for registry with the aligned holes at the top preload position to receive the retainer pin with greater vertical lost-motion clearance than the clearance between the plunger wedge and the bottom wall at such top preload position.

In the illustrated embodiments, the compression spring means are compressed approximately one-half their total travel when the plunger wedge is held at its top preload position by the retainer pin. In one embodiment a separate double coil spring unit acts between each wedge block and a corresponding spring seat and includes a central urethane filler element that is contacted by stem portions of the wedge block and spring seat when the plunger wedge is at the top preload position. In another embodiment, the compression spring means comprises a spring nest consisting of a plurality of aligned stepped seat rings each seat ring providing an inner pedestal portion and an outer rim portion and each seat ring having an outer compression ring overlying the rim portion and projecting axially beyond the pedestal portion and an inner compression ring overlying the pedestal portion and projecting axially beyond the outer compression ring, the compression rings being of energy-dissipating elastomer material such as urethane with the inner compression ring being under compression and the outer compression ring being free of load when the plunger wedge is at the top preload position.

A further feature of the invention relates to the slidable wedge blocks which have a friction face subject to preferential wear relative to the plunger wedge. Each wedge block as a top surface intersecting the friction surface to define a corner line, the top surface having a set of transverse serrations defining a set of wear teeth that present apex lines in predetermined parallel spaced relation to the corner line to serve as a positive index of the total wear. Are insert shim of a thickness determined by the total wear is provided for compensating for such wear. In the illustrated wedge blocks, the serrations are of triangular cross section and define triangular wear teeth characterized by a knife edge profile. The illustrated wedge blocks have a friction surface of less width than the plunger wedge and characterized by rounded side edge regions that accommodate even wear across the friction surface. When used with the spring nest, the wedge block has a stem portion of greater axial dimension than the spring nest to project through and align the individual seat rings that comprise the nest.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 1 is a fragmentary transverse sectional view showing one embodiment of a side bearing unit equipped with a precompression arrangement that defines the top preload position of the parts;

FIG. 2 is a fragmentary top plan view showing the side bearing unit of FIG. 1 in its top preload position;

FIG. 3 is an enlarged fragmentary section taken as indicated by the line 3–3 on FIG. 1;

FIG. 4 is a perspective view of a wedge block;

FIG. 5 is a to plan view of the wedge block of FIG. 4;

FIG. 6 is an enlarged fragmentary view taken approximately as indicated at the line 6–6 on FIG. 5 to facilitate the disclosure of the wear teeth;

FIG. 7 is a fragmentary transverse sectional view showing another embodiment of a side bearing unit;

FIG. 8 is an enlarged fragmentary sectional view showing details of a spring nest used in the embodiment of FIG. 8;

FIG. 9 is a cross-sectional view taken on the line 9–9 of FIG. 8; and

FIG. 10 is an elevational view of a shim for compensating for wedge block wear.

DESCRIPTION OF PREFERRED EMBODIMENT

Referring now to the drawings, preloaded embodiments of side bearings are shown in FIGS. 1–3 and in FIG. 7. The side bearing embodiments illustrated herein are related to the side bearings shown in MacDonnell U.S. Pat. No. 3,401,991 issued Sept. 17, 1968, and MacDonnell application Ser. No. 760,019 filed Sept. 16, 1968, the disclosures of which, to the extent not inconsistent herewith, are specifically incorporated herein by this reference.

The preloaded embodiments of this disclosure incorporate a rugged retainer pin P that holds the side bearings under predetermined compression and limits upward expansion so that constant contact of the side bearing with the car body is precluded both during level ride conditions and during high roll conditions.

The side bearing embodiment of FIGS. 1—3 is designated generally at 15 and is illustrated as a separate component to be installed in place of and at the same location as a standard side bearing. The invention also contemplates that the side bearing could be incorporated bodily within the bolster by use of a modified bolster design that provides operating pockets for the movable or live parts of the side bearing units, without requiring any change in the live parts.

The illustrated arrangement comprises a boxlike support housing 166 having a bottom wall 17, longitudinal outer and inner sidewalls 18, 19 and end walls 20, the housing 16 being open at the top. The housing 16, being illustrated as a separate unit, is shown equipped with integral flanges 16F for receiving suitable fasteners that are to be secured to the bolster.

The live parts of the friction system include a pair of wedge blocks or shoes 33 mounted to slide along the bottom wall 17 of the housing, the wedge blocks 33 presenting oppositely transversely extending friction surfaces 33F engageable with corresponding friction surfaces 35F along oppositely inclined underface regions of a floating upper wedge block or plunger 35. The friction surfaces 33F converge downwardly and the complementary plunger tapers downwardly to provide correspondingly downwardly tapering surfaces 35F for broad-faced frictional sliding engagement with the friction block surfaces. The wedge blocks 33 are resiliently biased in opposite directions by compression spring assemblies 30 which act to urge the wedge blocks 33 together. The compression spring assemblies 30 act oppositely on the end walls 20, each such assembly reacting through an adjustable spring seat 24 backed by a filler block 25 to transmit the spring load to the corresponding end wall.

Each of the wedge blocks 33 has a recessed rear face to provide a spring pocket 33P bounded by a spring seat surface 33S. Integral side and bottom wing portions 33W extend rearwardly from regions flanking the lower half of the spring seat surface 33S and a central guide stem portion 33G projects through the pocket 33P to terminate medially along the winged section. Each of the spring seats 24 has a corresponding guide stem portion 24G projecting towards the guide stem 33G of the corresponding wedge block and has an oppositely projecting rectangular central lug portion 24L provided with a central socket.

As indicated in phantom, an adjustment bolt 26 and a captive nut 26N is provided for removable seating in notched regions 20N provided in the end wall 20, with the bolt 26 projecting into the socket defined by the lugs 24L to facilitate initial assembly and adjustment of the units by holding the spring seat 24 spaced from end wall 20 a distance sufficient to enable insertion of the filler block 25. Thereafter, the bolts 26 are backed off so that the spring forces react through each spring seat 24 and corresponding filler block 25. Each filler block 25 has a vertical slot 25S to permit the block to be inserted in straddling relation to the shank of the bolt 26 and each block has a complementary central socket 25C bordering the slot 25S and shaped to receive and interlock with the lug portion 24L. The adjustment assembly is removed after the filler blocks 25 are in place.

Each of the spring assemblies 30 includes an inner coil spring 31 an an outer coil spring 32. In the disclosed arrangement, the inner coil spring 31 nests within the spring pocket 33P and is telescoped over and guided by the stem portions 33G and 24G while the outer coil spring 32 seats against the intermediate spring seat surface 33S and is guided by the winged sections 33W.

Additional spring resistance is provided in the form of solid rods R of a hard elastomer such as 70D durometer polyurethane. Each rod, as shown, is 2⅛ inches long and 1⅛ inch in diameter and is loosely disposed within each inner coil spring 31. The spring pocket defined between the seat stems 24G and wedge block stems is 2 inches when the plunger wedge 35 is at the illustrated preload position of FIG. 1.

The upper wedge block 35 acts as a floating plunger working against the spring-backed slidable blocks 33 in a relationship wherein the spring forces normally act to lift the upper wedge block. In the illustrated arrangement the sidewalls 18, 19 have confronting abutment lugs 18A, 19A centrally along the top edges thereof and the floating block 35 has vertical guideways 35G along opposite side faces thereof and receiving the lugs 18A, 19A. The guideways 35G terminate short of the base of the upper block so that central abutment ledges 35A are provided which are engageable with the abutment lugs 18A, 19A to prevent removal of the plunger block 35. The floating block 35, as shown herein, is 4⅝ inches wide, has a 2⅞-inch long bottom face and a a¼-inch long top face and is 4 inches high so that its side faces 35F are inclined at an angle of 51½° from the horizontal.

In the assembly of the side bearing units, as is shown in greater detail in U.S. Pat. No. 3,401,991, the plunger block 35 is first inserted into the housing 16 adjacent one end thereof and in a canted relationship wherein the friction face 35F seats flush against the bottom wall 17. The plunger block 35 is then slid along the bottom wall towards the center of the housing. In this canted center position, the lugs 18A, 19A project part way into the upper ends off the obliquely oriented guideways 35G so that the plunger block can be rotated to a symmetrical position wherein the abutment lugs 18A, 19A extend crosswise in the upper regions of the guideways.

Adequate end clearance now exists in the housing 16 on both sides of the block 35 to permit insertion of the slidable wedge blocks 33, and their associated spring seats 24 and coil springs 31, 32. The winged sections 33W of the slide blocks serve as a cradle for the end of the outer coil spring 32, with the interengagement off the cradle and the coil acting acting to hold the slide block against tipping during assembly. The bolts 226 are actuated to advance the spring seats 24 from the housing end walls so that the filler blocks 25 can be dropped into place, with the bolts then being backed off to permit the spring reaction to be taken by the filler blocks. The advance of the spring seats 24 develops a spring thrust against the slide blocks to lift the floating block 35. This defines the initial assembled position of the side bearing and in this position the outer coil springs 32 hold the plunger block 35 up to establish a clearance of 3½ inches while the inner coil 31 is not compressed.

In the illustrated embodiment, a precompression arrangement acts to stop the plunger wedge 35 at a top position as illustrated in FIG. 1. In such position the top surface of the plunger wedge 35 defines a total height of 5¼ inches for the side bearing unit whereas the nominal clearance at the mounting location for standard side bearings is about 5⅜ to 5½ inches. It may be noted that the precompression arrangement, in limiting the upward movement of the plunger wedge, holds the wedge blocks in spaced-apart relation as shown in FIG. 1 to maintain predetermined compression of the spring system and establish a substantial level of preload. In the illustrated arrangement, a clearance of three-fourth inch exists beneath the plunger at the preload position, the inner coil spring is partly compressed and the urethane rod is lightly engaged between the stems.

In the precompression arrangement, illustrated for purposes of disclosure, the housing sidewalls 18, 19 have aligned holes 18H, 19H sized to receive the pin with limited clearance and the floating plunger 35 has a transverse through-hole 35H of a generally oval, vertically elongated cross section to establish registry with the holes 18H, 19H over a range of vertical travel of the plunger greater than the three-fourths inch clearance which exists beneath the plunger. In the precompressed position of FIG. 1, the curved lower face of the plunger through-hole contacts the underface of the retainer pin P and the curved upper faces of the sidewall holes 18H, 19H contact the upper face portions adjacent opposite ends of the retainer pin P.

The retainer pin P is of seven-eighths inch diameter, the sidewall holes 18H, 19H are 1 inch in diameter and the through-hole 35H is 1¼ inches wide and 1 13/16 inches high so that the total travel clearance of the pin and slot combination is about 1 inch, substantially greater than the three-fourths inch clearance beneath the plunger. Thus, the pin and the surfaces it contacts are never subjected to the car body load.

The retainer pin is shown in FIG. 2 with an integral enlarged head 40 at one end and a transverse hole 41 adjacent the other end for a cotter pin 42. A washer 43 is applied over the end of the retainer pin to lie between the cotter pin 42 and sidewall 19.

The side bearing units of this invention are applied at the same location and are direct replacements of standard side bearings. Where necessary, mounting holes are drilled into the top of the truck bolster (not shown) to accommodate fasteners (not shown) for securement of the flanges 16F. Where the individual car and truck environment result in unbalance during initial installation, one or more shims (not shown) may be inserted beneath one or both of the side bearing units.

The slidable wedge block 33 is shown in greater detail in FIGS. 4 to 6 and has its top face 33T provided with serrations to define a set of wear teeth 44–1 to 44–5, each of knife edge sharpness, having a depth of one-eighths inch, and located at one-eighth inch peak-to-peak spacing. The serrations are of triangular cross section to define triangular-shaped wear teeth characterized by a vertical forward face. The first of the wear teeth 44–1 is spaced one-eighth inch from the apex or corner line 45 which is determined by the intersection of the friction face 33F and the top face 33T. The spaced apex lines of the wear teeth serve as a scale to indicate the amount of friction face material that remains. The positive indication, thus provided, facilities visual inspection of the actual wear.

In practice, for application in Canada, a set of five wear teeth, as shown herein, in provided and for application in the U.S., a set of three wear teeth is provided, namely the teeth designated 44–1, 44–2 and 44–3.

When inspection shows that the wedges 33 have worn to a point where the plunger wedge contacts the apex line of the first wear tooth 44–1, a shim 46 as shown in FIG. 10 can be inserted between the rear of the filler block 25 and the corresponding end wall. A mounted shim 46 is shown in FIGS. 1 and 2 for purposes of illustrative disclosure but it should be understood that shims are not to be used when the wedges 33 are new, and shims should be used in matched sets rather than at only one end of the unit.

The procedure for installation of the shims 46 requires, for safety, that the car be jacked free of the truck so that the truck can be removed from beneath the car. Each side bearing may now be visually checked. If wear to the first wear line 40–1 is observed a retainer bolt and nut assembly is applied at one end of the unit to shift the filler blocks 25 inwardly about one-half inch and a one-eighth inch thick shim 46 is inserted in the end of the unit. The bolt and nut assembly is then removed and the operation is repeated at the other end of the unit. This restores the unit to a new condition.

If inspection shows that wear had progressed to the second wear line 44–2, the same procedure is followed but a one-fourth inch thick shim is used instead of a one-eighth inch thick shim.

In U.S. practice, if the wear has progressed to the third or final wear line 44–3, the wedge is to be replaced by a new wedge and any shims previously installed should be removed. In Canadian practice, the wedge is replaced after the wear has progressed to the fifth line 44–5.

It should be noted that the side edges of the friction faces 33F are radiused or rounded as shown at 33R to provide an effective contact surface of less width than the friction surface 35F presented by the plunger wedge. This arrangement allows even wear on the total area of the wedge faces 33F without creating a stepped edge contour on the wedge face. Such a stepped edge contour is objectionable as it would act to hold the plunger wedge 35 towards the side thrust wear plate 18W (FIG. 2) causing aggravated wear and leading ultimately to locking up of the live parts of the friction system.

Another side bearing embodiment, as shown in FIGS. 7 to 9, provides a more compact unit capable of operating to higher load capacities. Many of the parts are similar in construction and function to corresponding parts in the embodiment of FIGS. 1 and 2 are identified by corresponding characters of the 100 series.

Thus, the side bearing unit 115 has a support housing 116 that receives a pair of slidable wedges 133 and a floating plunger wedge 135. Each slidable wedge 133 is loaded by a spring nest which includes a spring seat or filler 124 that reacts directly against the end wall 120 of the housing. The preload position of the plunger wedge 135 is set by the retainer pin P which operates in sidewall holes 118H, 119H and a transverse hole 135H in the plunger. These parts may be of the same size as previously described to define a plunger travel clearance of three-fourth inch.

Each spring nest includes a flat metal end ring 150 and a set of three stepped metal seat rings 151 each providing an inner pedestal portion 151P to contact an inner compression ring 131 and an outer rim portion 151R to contact an outer compression ring 132. The corner region defined at the junction of the pedestal and rim portions acts as a guide and locator surface for the outer compression ring 132 which is under load only at the lower extreme of plunger travel. The inner compression ring 131 is free floating but is normally held partly compressed by the retainer pin P.

In the embodiment illustrated for purposes of disclosure each of the metal seat rings 151 has a pedestal portion 151P, one-half inch thick and having an I.D. of 1¼ inches and an O.D. of 2⅝ inches, and has a rim portion 151R, one-fourth inch thick and having an I.D. of 2⅝ inches and an O.D. of 3⅞ inches. The inner compression ring 131, in its original form, is of donut shape having an I.D. of 1½ inches and an O.D. of 2¼ inches and having a circular section of ⅜-inch diameter. The outer compression ring 132, in its original form, is of donut shape having an I.D. of 2⅝ inches and an O.D. of 2¼ inches and having a circular section of 7/16-inch diameter. Each of the compression rings is of urethane having a shore A hardness of about 90.

Each compression ring has a preset. Presetting is provided by cycling each element at least four times to a deflection value of about one-fourth its initial height. Presetting of the compression rings insures that each ring maintains its desired deflection characteristics so that its designed performance is retained throughout a long operating life. In the illustrated side bearing arrangement, the preset feature is additionally important for minimizing required mounting clearances and overall size of the side bearing units.

For the particular details given herein, the preload position of the plunger 135 provides a load travel of three-fourth inch. For this preload position, each of the spring nests is precompressed a total of one-fourth inch and is capable of about one-half inch additional travel. For the indicated wedging angle A of about 51½°, the three-fourth inch vertical travel of the plunger produces three-eighth inch horizontal travel of each sliding edge so that the plunder goes solid before the spring nest goes solid.

The spring nest is supported and guided on the wedge stem 133G which is of greater length than the free height of the entire assembly of the three seat rings 151, the end ring 150 and the three sets of compression rings 131, 132. For the preload position, the wedge stem 133G projects about one-half inch into the center bore of the spring seat 124. Therefore, for the free height condition of the spring nest, the wedge stem 133G projects about one-fourth inch into the bore of the spring seat 124.

Assembly of the side bearing unit of FIGS. 7 to 9 is facilitated by reason of the relatively short compression stroke of the spring nests. As described previously, the floating plunger 135 is inserted first, being introduced in a canted relationship at either end and then tipped upright at the center of the housing to bring the abutments into the plunger grooves 135G. The plunger can then be lifted to the phantom line position as designated at P' in FIG. 7, such position being determined by the engagement of the plunger ledges 135A with the abutments 118A.

The entire spring nest, except for the spring seat 124, is preassembled upon the wedge stem 133G, this subassembly being angled into place, wedge first, to seat beneath the elevated plunger 135. The spring seat 124 is inserted vertically into the end space existing between the wedge stem and the end wall 120 and is then telescoped onto the wedge stem. After both sets of wedges, spring nests and spring seats are thus installed, the plunger wedge is lowered and is compressed to bring the holes 118H, 119H and 135 into registry for receiving the retainer pin P.

Thus, while preferred constructional features of the invention are embodied in the structure illustrated herein, it is to be understood that changes and variations may be made by those skilled in the art without departing from the spirit and scope of the appended claims.

What I claim is:

1. In a side bearing assembly that includes a boxlike support having a bottom wall, a pair of upstanding sidewalls, and a pair of upstanding end walls, a pair of wedge blocks slidably mounted on said bottom wall, said wedge blocks having oppositely inclined downwardly converging surfaces, an upper plunger wedge mounted on said wedge blocks and having oppositely inclined downwardly converging underface portions slidably engaged on and mating with said inclined block surfaces, and compression spring means reacting oppositely outwardly on said end walls and resiliently biasing said wedge blocks oppositely inwardly, said side bearing assembly being characterized by a precompression arrangement for stopping upward travel of the plunger wedge at a top preload position wherein said plunger wedge holds said wedge blocks in spaced-apart relation to maintain predetermined compression of said spring means, said precompression arrangement including a retainer pin projecting through said sidewalls and said plunger wedge, said sidewalls having aligned holes substantially centrally thereof and said plunger wedge having a transverse hole substantially centrally thereof for registry with said aligned holes at said top preload position to receive said retainer pin with greater vertical lost-motion clearance than the clearance between the plunger wedge and the bottom wall at the top preload position of the plunger wedge.

2. In a side bearing assembly as defined in claim 1 wherein said precompression arrangement provides a top preload position wherein the total height of the side bearing assembly is less than the vertical mounting clearance available for the side bearing assembly.

3 In a side bearing assembly as defined in claim 1 wherein said precompression arrangement provides a top preload position wherein the total height of the side bearing assembly is less than the vertical mounting clearance available for the side bearing assembly and the plunger travel clearance relative to the bottom wall is between about three-fourth inch and about 1 inch.

4. In a side bearing assembly as defined in claim 3 wherein said precompression arrangement provides a top preload position wherein said spring means is compressed about one-half its total available compression travel.

5. In a side bearing assembly as defined in claim 1 wherein the transverse hole in said plunger wedge is vertically elongated to provide vertical lost-motion clearance for the pin about equal to the clearance beneath the plunger wedge at the top preload position of the plunger wedge.

6. In a side bearing assembly as defined in claim 1 wherein separate compression spring means reacts between each end wall and corresponding wedge block, each compression spring means including a double coil unit having an outer coil encircling an inner coil and having a filler element comprised of a polymer of urethane disposed within the inner coil, a separate spring seat outwardly of each double coil unit, each spring seat and wedge block having a stem portion projecting into the corresponding end of the inner coil for engagement with the corresponding end of the filler element, and wherein said precompression arrangement provides a top preload position wherein each coil of said compression spring means is compressed to a position wherein said stem portions contact opposite ends of said filler elements.

7. In a side bearing assembly as defined in claim 6 wherein the transverse hole in said plunger wedge is vertically elongated to provide vertical lost-motion clearance for the pin about equal to the clearance beneath the plunger wedge at the top preload position of the plunger wedge.

8. In a side bearing assembly as defined in claim 1 wherein separate compression spring means reacts between each end wall and corresponding wedge block, each compression spring means comprising a spring nest consisting of a plurality of aligned stepped seat rings each providing an inner pedestal portion and an outer rim portion, an outer compression ring overlying the rim portion and projecting axially beyond the pedestal portion and an inner compression ring overlying the pedestal portion and projecting axially beyond the outer compression ring, each compression ring being of energy dissipating elastomer material, and wherein said precompression arrangement provides a top preload position wherein each inner compression ring is under compression and each outer compression ring is free of load.

9. In a side bearing assembly as defined in claim 8 wherein the transverse hole in said plunger wedge is vertically elongated to provide vertical lost-motion clearance for the pin about equal to the clearance beneath the plunger wedge at the top preload position of the plunger wedge.

10. In a side bearing assembly as defined in claim 8 wherein each wedge block has a stem portion of greater axial dimension than the corresponding spring nest, said stem portion receiving the seat rings of said corresponding spring nest to align the same.

11. In a side bearing assembly as defined in claim 1 wherein separate compression spring means reacts between each end wall and corresponding wedge block, each compression spring means comprising a spring nest consisting of a plurality of aligned stepped seat rings each providing an inner pedestal portion and an outer rim portion in a relationship wherein greater axial clearance exists between successive rim portions than between successive pedestal portions, a separate outer compression ring overlying each rim portion and a separate inner compression ring overlying each pedestal portion to be compressed between successive pedestal portions before any outer compression ring is compressed between successive rim portions, each compression ring being of energy dissipating elastomer material.

12. In a side bearing assembly as defined in claim 11 wherein each wedge block has a stem portion of greater axial dimension than the corresponding spring nest, said stem portion receiving the seat rings of said corresponding spring nest to align the same.

13. In a side bearing assembly that includes a boxlike support having a bottom wall and a pair of upstanding end walls, means to secure said support to a railway truck bolster, a pair of wedge blocks slidably mounted on said bottom wall, said wedge blocks having oppositely inclined transversely extending friction surfaces, a plunger wedge mounted on said wedge blocks and having oppositely inclined underface portions slidably engaged on and mating with said inclined friction surfaces, and separate compression spring means reacting between each end wall and corresponding wedge block to resiliently urge said wedge blocks oppositely inwardly and establish a preloaded normal position for said wedge blocks and said plunger wedge wherein a central clearance space extends full length therebetween, each compression spring means including a separate spring seat shiftably mounted in said support to vary the clearance available between said spring seat and the corresponding end wall, each wedge block having a horizontal top surface intersecting the friction surface thereof to define a corner line, said top surface having a set of transverse serrations defining a set of wear teeth that present a set of apex lines in predetermined parallel spaced relation to said corner line.

14. In a side bearing assembly as defined in claim 13 wherein said serrations are triangular in cross section and define triangular-shaped wear teeth each having a knife edge profile.

15. In a side bearing assembly as defined in claim 13, a separate shim insert removably mounted between each spring seat and corresponding end wall, said insert having a thickness corresponding to the spacing of said apex lines.

16. In a side bearing assembly as defined in claim 13, wherein each wedge block has a friction surface of less width than the plunger wedge and characterized by rounded side edge regions that accommodate even wear of the total friction surface.

17. In a side bearing assembly that includes a boxlike support having a bottom wall and a pair of upstanding end walls, means to secure said support to a railway truck bolster, a pair of wedge blocks slidably mounted on said bottom wall, said wedge blocks having oppositely inclined transversely extending friction surfaces, a plunger wedge mounted on said wedge blocks and having oppositely inclined underface portions slidably engaged on and mating with said inclined friction surfaces, and separate compression spring means reacting between each end wall and corresponding wedge block to resiliently urge said wedge blocks oppositely inwardly and establish a preloaded normal position for said wedge blocks and said plunger wedge wherein a central clearance space extends full length therebetween, each wedge block having a friction surface of less width than the plunger wedge and characterized by rounded side edge regions that accommodate even wear of the total friction surface.